Figure 1:
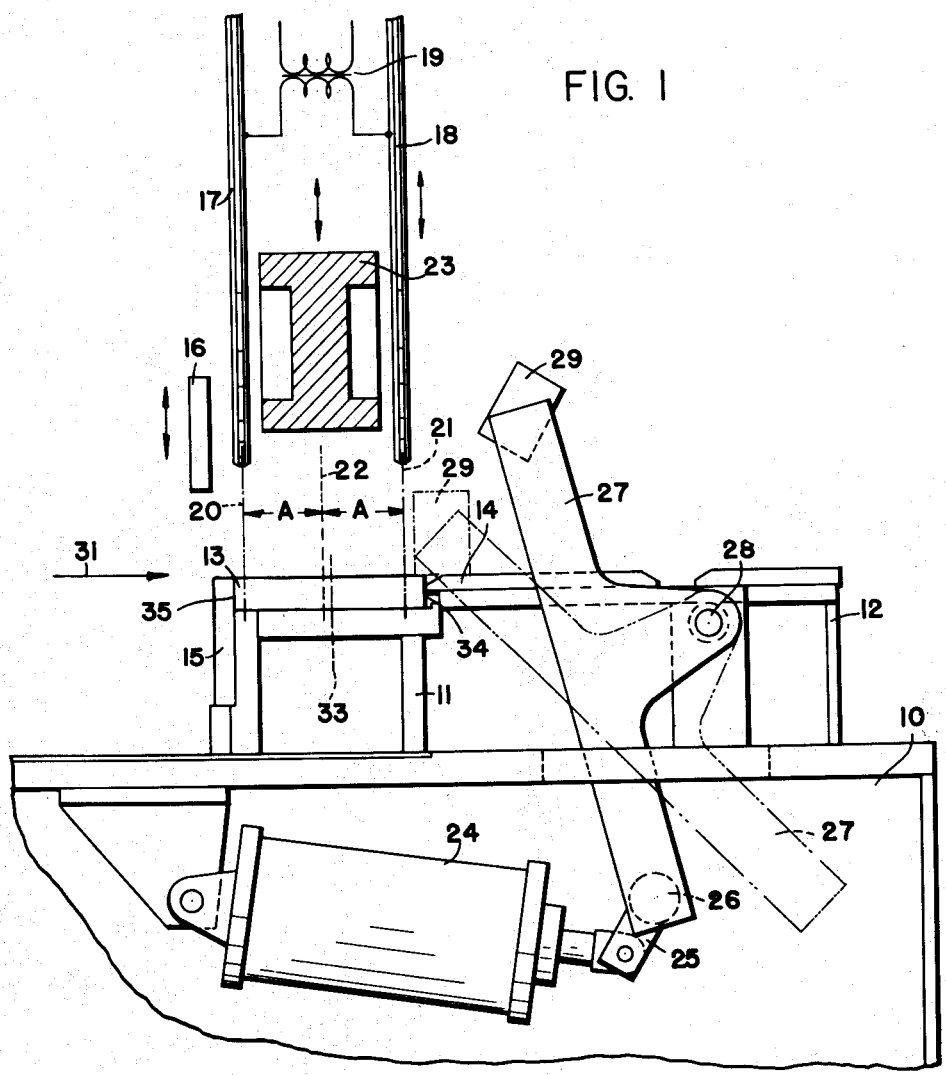

Feb. 13, 1962     F. R. WOODWARD     3,021,415

REVERSIBLE PLATEN MOUNTING FOR TRAVEL TYPE STRIP WELDERS

Filed April 9, 1959

INVENTOR
FOSTER R. WOODWARD

BY *Francis J. Klempay*

ATTORNEY

United States Patent Office 3,021,415
Patented Feb. 13, 1962

3,021,415
REVERSIBLE PLATEN MOUNTING FOR TRAVEL TYPE STRIP WELDERS
Foster R. Woodward, Warren, Ohio, assignor to The Taylor-Winfield Corporation, Warren, Ohio, a corporation of Ohio
Filed Apr. 9, 1959, Ser. No. 805,301
1 Claim. (Cl. 219—82)

The present invention relates generally to the art of electrical resistance welding and more particularly to an improved platen mounting arrangement for use in travel type strip welders and the like.

In apparatus of this type it is common practice to utilize a relatively large current conductive welding platen which comprises either the lower and fixed electrode or a fixed bridging member and a movable electrode assembly which comprises one or two welding electrode wheels of highly conductive material. In the use of such apparatus the trailing end of one coil of strip and the leading end of a succeeding coil of strip are overlapped on the welding platen and the electrode wheel or wheels are rolled across the overlapped strip ends to thus enable the welding current to pass vertically therethrough. In this manner the leading and trailing ends of the coils of strip are fused and welded together to form a continuous length of strip.

It is the primary or ultimate object of the present invention to provide a highly improved platen mounting arrangement for travel type strip welders and the like wherein the operating life of the platen is substantially increased. The welding electrode wheel or wheels of a travel type strip welder are relatively thin in thickness dimension and upon continued use of the welder the welding platen becomes dirty or burned along the line or lines of travel of the welding electrode wheel or wheels. In prior art apparatus this has necessitated the replacement of the welding platen even though only a very small portion thereof has become dirty or burned. However, the mounting of the welding platen according to the teachings of the present invention is such that the platen may be reversed to expose clean and unburned portions thereof to the welding electrode wheel or wheels without complete replacement of the same.

A further object of the invention is to provide an improved platen mounting arrangement for travel type strip welders and the like wherein additional clamping or bearing area is provided for the clamp and gauge bar at a point very closely adjacent the path of travel of the welding electrode wheel or wheels. As will be hereinafter more fully apparent, the center line of the welding platen is mounted in offset relation with respect to the center line of the welder and/or the welding electrode wheels in a direction toward the clamp and gauge bar.

Still another object of the invention is to provide a platen mounting arrangement for travel type strip welders and the like which is characterized by its extreme simplicity in construction and ease of use. The mounting of the wleding platen may be reversed in a minimum of time and with a minimum of effort to expose clean and unburned portions thereof to the welding electrode wheel or wheels.

The above, as well as other objects and advantages of the present invention, will become more fully apparent upon consideration of the following specification and accompanying drawing wherein there is disclosed a preferred embodiment of the invention.

Figure 2:
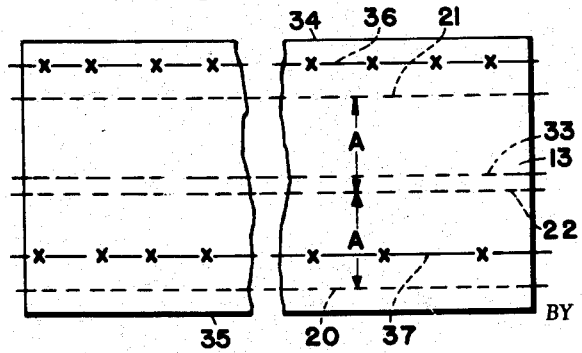

In the drawing:

FIGURE 1 is a fragmentary side sectional view of a travel type strip welder embodying a reversibly mounted welding platen in accordance with the teachings of the present invention; and FIGURE 2 is an enlarged fragmentary plan view showing specifically the welding platen embodied in the travel type strip welder of FIGURE 1.

Referring now to the drawing, and initially to FIGURE 1 thereof, there is shown in somewhat schematic fashion a travel type strip welder employing a reversibly mounted platen in accordance with the teachings of the present invention. The travel type strip welder comprises a base 10 which serves as a support for a platen mounting base 11 and a strip supporting table 12. Mounted on the top of the platen supporting base 11 is a welding platen, indicated by the reference numeral 13, which extends transversely across the path of travel of the strip and is generally rectangular to define forward and rear edges 34 and 35, respectively. The welding platen 13 is preferably fabricated from a highly current conductive material and serves as a means for bridging and directing the current flow between the welding electrode wheels.

Attached to the rear face of the platen supporting base 11 is a lower shear blade 15 which is adapted to cooperate with a vertically movable upper shear blade 16 in shearing the ends of the strip. It will be noted that the lower shear blade 15 extends above the top surface of the platen supporting base 11 and the upper end thereof forms an abutment which is adapted to be engaged by the rear edge 35 of the welding platen 13. Mounted on the top surface of the strip supporting table 12 is a clamping plate 14 whose rear end projects rearwardly beyond the strip supporting table 12 and forms an abutment which is adapted to be engaged by the forward edge 34 of the welding platen 13. The upper end of the lower shear blade 15, the platen supporting base 11 and the rear end of the clamping plate 14 define, in essence, a channel-shaped transversely extending pocket which is adapted to snugly receive the welding platen. It will be noted that the upper surfaces of the lower shear blade 15, the welding platen 13 and the clamping plate 14 are all disposed in the same horizontal plane to present a flat surface to the strip. In this manner, the structure, including the platen supporting base 11, the platen 13, the clamping plate 14 and the lower shear blade 15, is very rigid and compact and the welding platen is properly positioned. The upper shear blade 16 is mounted by suitable mechanism, not shown, so that the same is adapted to move vertically with respect to the lower shear blade 15 whereby the shear blades cooperate in shearing the strip ends. Of course, the upper and lower shear blades extend transversely across the path of strip travel.

Disposed above the welding platen 13 are a pair of welding electrode wheels 17 and 18 which are generally circular in end elevation and are preferably fabricated from a highly conductive material. The welding electrode wheels 17 and 18 are connected through suitable rotary current transfer devices, not shown, to the opposite secondary terminals of a welding transfomer 19. The primary of the welding transformer 19 is interconnected with a suitable electrical source, not shown, and conventional control equipment, also not shown, may be employed for regulating and controlling the flow of welding current to the welding electrode wheels 17 and 18.

The welding electrode wheels 17 and 18 are adapted for vertical movement whereby the same may be moved into pressure engagement with the strip ends to be welded and the welding platen 13. In accordance with conventional practice, when the welding electrode wheels 17 and 18 are rolled across the overlapped strip ends, current is caused to flow from one of the electrode wheels, vertically downward through the overlapped strip ends, longitudinally through the welding platen 13, vertically upward through the overlapped strip ends and then to the other welding electrode wheel to complete the welding of the strip ends along two longitudinally spaced parallel lines of travel and weld which are indicated by the reference numerals 20 and 21 in the drawing. This general method of resistance welding is known in the art as series seam welding. The welding electrode wheels 17 and 18 are equally spaced on opposite sides of a center line 22 and the distance each of the welding electrode wheels is longitudinally spaced from the center line 22 is indicated by the reference indicia A.

Disposed between the welding electrode wheels 17 and 18 is a vertically movable center clamp 23 which, in accordance with well known teachings, is adapted to clamp the overlapped strip ends against the welding platen 13 during actual welding operations. The center clamp 23 extends transversely across the path of strip travel and is adapted to prevent movement of the overlapped strip ends during actual welding operations.

Pivotly mounted within the base 10 is a fluid cylinder 24 whose piston rod is pivotly connected to a clevis 25 that extends from a rod 26 intermediate the ends thereof. The rod 26 extends transversely and mounts on its ends outwardly of the path of strip travel a pair of transversely spaced and vertically extending parallel bell cranks 27. The bell cranks 27 are pivoted intermediate their ends on suitable pivot pins 28 which extend outwardly from the strip supporting table 12. Spanning the bell cranks 27 at their upper ends is a clamp and gauge bar 29. The clamp and gauge bar 29 extends transversely across the normal path of strip travel.

Considering now the operation of the travel type series strip welder above described, it will be assumed that the strip travels from left to right when looking at FIGURE 1 of the drawing as is indicated by the arrow 31. The trailing end of one coil of strip is stopped in a position where the extreme end portion thereof projects rearwardly over the lower shear blade 15. The fluid cylinder 24 is now actuated in such a manner that the clamp and gauge bar 29 is lowered into clamping relation with respect to the trailing end of the coil of strip. It will be noted that the clamp and gauge bar 29 clamps the trailing strip end along the forward edge portion of the welding platen 13 at a point closely adjacent the transverse line of travel of the welding electrode wheels. With the trailing strip end thus clamped by the clamp and gauge bar 29 the upper shear blade 16 is moved vertically through a shearing cycle to crop or shear the overhanging end portion of the trailing strip end.

Next, the previously cropped or sheared leading end of a succeeding coil of strip is moved into the welder until the extreme forward edge thereof engages and abuts against the clamp and gauge bar 29. At this time the trailing strip end and the leading strip end are properly overlapped as is readily apparent. The center clamp 23 is now moved downwardly into tight clamping relation with respect to the overlapped strip ends and the welding platen 13. The center clamp 23 clamps the overlapped strip ends at a point closely adjacent the lines of travel 20 and 21 of the welding electrode wheels 17 and 18 as is shown in FIGURE 1 of the drawing.

To complete the actual welding operations the welding electrode wheels 17 and 18 are lowered into pressure engagement with the overlapped strip ends and the welding platen 13. The welding electrode wheels 17 and 18 are caused to roll transversely across the overlapped strip ends and during this rolling movement welding current is supplied thereto from the welding transformer 19. As set forth above, welding current flows from one of the welding electrode wheels, down through the overlapped strips ends, longitudinally through the bridging welding platen 13, upwardly through the overlapped strip ends and then to the other welding electrode wheel to complete the welding of the overlapped strip ends along two parallel lines of travel and weld as indicated by the reference numerals 20 and 21. Of course, welding current may be supplied either intermittently or continuously to the welding electrode wheels to produce either a series of spaced welds or continuous welds along the lines of travel and weld 20 and 21.

The rather schematic showing of the welder in FIGURE 1 does not disclose all of the ancilliary component parts and mechanisms usually associated with a strip welder of this type. For example, pinch rolls are usually provided for moving the strip ends through and to the welder and it is also common practice to provide additional clamping means as will be understood by those skilled in the art.

Upon continued usage of the strip welder the welding platen 13 will become burned and/or dirty along the lines of travel and weld 20 and 21 of the welding wheel electrodes 17 and 18. This is due to the fact that extremely high current densities are experienced where the welding current enters and leaves the welding platen as the welding electrode wheels 17 and 18 roll across the overlapped strip ends. Also, the tight pressure engagement between the welding electrode wheels 17 and 18 and the welding platen 13 causes the welding platen to become dirty along the lines of travel 20 and 21 and this is especially true in the welding of coated or similarly treated strip. When the welding platen 13 becomes burned and dirty along the lines of travel 20 and 21 it is, in accordance with prior art practice, necessary to replace the welding platen since a burned and dirty platen adversely affects the actual welding operations.

However, according to the teachings of the present invention, it is not necessary to replace the welding platen when the same becomes burned or dirty along the lines of travel 20 and 21. As shown in the drawing, the center line 33 of the welding platen 13 is spaced a slight distance forwardly in the direction of strip travel with respect to the center line 22 of the welding electrode wheels 17 and 18 and the welder.

When the welding platen 13 becomes dirty and burned it is only necessary to remove the welding platen from the pocket defined by the upper end of the lower shear blade 15, the platen supporting base 11 and the rear end of the clamping plate 14, turn the same end-to-end and replace it in the pocket whereby the edge 34 which was previously adjacent the clamping plate 14 is now disposed adjacent the lower shear blade 15. Then the welder is again ready for welding the overlapped ends of the coils of strip. When the welding platen is turned end-to-end as above described the welding electrode wheels 17 and 18 will now travel along the lines 36 and 37, respectively, and it will be noted in FIGURE 2 of the drawing that the lines 36 and 37 are transversely spaced from the original lines of travel 20 and 21. The spacing of the lines of travel 20, 21, 36 and 37 of the welding electrode wheels is provided by the offset mounting of the welding platen with respect to the center line of the welder. The line 36 is spaced from the line 21 by a distance equal to twice the distance between the center line 22 of the welder and the center line 33 of the welding platen and this same relation also holds true for the lines 37 and 20. In this manner clean portions of the welding platen are exposed to the welding electrode wheels 17 and 18 upon end-to-end turning of the welding platen.

The above mounting arrangement for the welding platen allows the welding platen to be used for a much longer period of time than has heretofore been possible. Also, to further prolong the usable life of the welding platen, the same may be turned over to expose the bottom surface thereof to the welding electrode wheels. After the platen has been turned over it can then again be turned end-to-end whereby two offset pairs of lines of travel of the welding electrode wheels are provided on each side of the welding platen. It should therefore be apparent that mounting arrangement of the present invention allows the welding platen to be used many times longer than the welding platens in prior art apparatus.

Another important aspect of the present invention is that the center line 33 of the welding platen is offset from the center line 22 of the center in a direction toward the clamp and gauge bar 29. This offset provides a forwardly extending projection of appreciable surface area against which the clamp and gauge bar 29 is adapted to clamp the trailing end. Thus, the trailing end may be clamped at a point closely adjacent the welding electrode wheels and the leading strip end may be gauged at this same point. It should be apparent that this overhanging projecting end portion of the welding platen 13 is provided even when the same is turned end-to-end and/or is turned over.

Another important aspect of the present invention is the ease in which the mounting of the welding platen may be reversed to expose clean surface areas of the same to the welding electrode wheels. All that is necessary is to properly turn the welding platen and the welder is again ready for welding operations. This can be accomplished in a minimum of time and with a minimum of effort without seriously interrupting the continuous operation of the welder.

It should thus be apparent that the objects initially set forth have been accomplished. Although there has been described and shown an illustrated embodiment of the invention, many changes may be made without departing from the clear teachings thereof. For example, the platen mounting arrangement may be employed with travel type strip welders of different designs than the welder disclosed. Accordingly, reference should be had to the following appended claim in determining the true scope and intent of the invention.

I claim:

In apparatus for joining strip having a slab-like current-conductive platen extending transversely of the path of strip travel and a pair of spaced electrode wheels adapted to be moved transversely across the face of the platen the improvement comprising a flat support for said platen, a flat plate extending outwardly from said support in the direction of the path of strip travel and having a flat top surface to support said strip and an edge surface to engage a side edge of said platen, said top surface lying in the same plane as the top surface of said platen, and means engaging the opposite side edge of said platen and having an upper surface lying in said plane, the transversely extending center line of said platen being offset with respect to the median plane of said wheels, the arrangement being such that said support and said edge surface of said plate as well as said means form an upwardly open channel to receive and retain said platen against edgewise movement and wherein upon said platen being turned end-for-end the lines of contact or reaction between said wheels and platen will be shifted edgewise of said platen.

References Cited in the file of this patent

UNITED STATES PATENTS

| | | |
|---|---|---|
| 2,231,408 | Fechheimer et al. | Feb. 11, 1941 |
| 2,412,648 | Rendel | Dec. 17, 1946 |
| 2,634,353 | Geiszler et al. | Apr. 7, 1953 |